(12) United States Patent
Lee

(10) Patent No.: US 7,258,328 B2
(45) Date of Patent: Aug. 21, 2007

(54) METHOD FOR DESIGNING RADIAL DISTRIBUTORS IN MASS TRANSFER VESSEL

(75) Inventor: Jong Eun Lee, Seoul (KR)

(73) Assignee: Korea Western Power Co., Ltd. (KR)

( * ) Notice: Subject to any disclaimer, the term of this patent is extended or adjusted under 35 U.S.C. 154(b) by 253 days.

(21) Appl. No.: 11/151,051

(22) Filed: Jun. 13, 2005

(65) Prior Publication Data

US 2006/0009870 A1    Jan. 12, 2006

(30) Foreign Application Priority Data

Jul. 12, 2004    (KR) .................... 10-2004-0054104

(51) Int. Cl.
*B01F 3/04*    (2006.01)
*G06F 19/00*   (2006.01)

(52) U.S. Cl. .................. 261/97; 261/110; 700/97; 700/283

(58) Field of Classification Search ............... 261/23.1, 261/97, 98, 110, 111, 112.1, 112.2, DIG. 39; 700/97, 98, 283

See application file for complete search history.

(56) References Cited

U.S. PATENT DOCUMENTS

| | | | | |
|---|---|---|---|---|
| 2,185,785 A | * | 1/1940 | Dorr et al. ................... | 210/801 |
| 4,591,463 A | * | 5/1986 | Nahra et al. ................ | 261/116 |
| 6,907,751 B2 | * | 6/2005 | Kalbassi et al. ............. | 62/617 |

\* cited by examiner

*Primary Examiner*—Scott Bushey
(74) *Attorney, Agent, or Firm*—Cantor Colburn LLP

(57) ABSTRACT

Disclosed is a mass transfer vessel or a mass transfer tower, which is installed in water purification equipment, condensate water demineralization equipment, sewage treatment equipment, waste water treatment equipment, or chemical reactors to perform filtration, adsorption, ion exchange, regeneration of an ion exchange resin, chemical reaction, and spray of a chemical cleaning solution, and more particularly to a method for designing radial distributors in a mass transfer vessel, which uniformly distribute influent flow quantity into all cross sections so as to improve the efficiency of a mass transfer process, such as filtration, adsorption, ion exchange, a chemical reaction process, and a chemical cleaning process.

2 Claims, 9 Drawing Sheets

(This invention)

(This invention)

(This invention)

METHOD FOR DESIGNING RADIAL DISTRIBUTORS IN MASS TRANSFER VESSEL

BACKGROUND OF THE INVENTION

1. Field of the Invention

The present invention relates to a mass transfer vessel or a mass transfer tower, which is installed in water purification equipment, condensate water demineralization equipment, sewage treatment equipment, waste water treatment equipment, or chemical reactors to perform filtration, adsorption, ion exchange, regeneration of an ion exchange resin, chemical reaction, and spray of a chemical cleaning solution, and more particularly to a method for designing radial distributors in a mass transfer vessel, which uniformly distribute influent flow quantity into all cross section so as to improve the efficiency of a mass transfer process, such as filtration, adsorption, ion exchange, a chemical reaction process, and a chemical cleaning process, and is applied to the spraying nozzle having a single pipe or plural pipes for spraying a chemical cleaning solution or washing water into upper and lower portions of disk-shaped equipment.

2. Description of the Related Art

As well known to those skilled in the art, a filtration vessel (referred to as a filtration tower), an adsorption tower, a chemical reaction tower, an ion exchange resin tower, an ion exchange resin regeneration tower, a chemical cleaning tower, and a washing tower, which perform filtration, reaction, and washing or chemical cleaning processes, are installed in water purification equipment, condensate water demineralization equipment, sewage treatment equipment, waste water treatment equipment, or chemical reactors. A fluid, which is put in the above vessels, undergoes filtration, adsorption, ion exchange or chemical reaction, when the fluid passes through filter medium layers, thereby being changed into a fluid satisfying quality standard.

Mass transfer vessels (also, referred to as "mass transfer containers"), which are used in a mass transfer process using various filter media in water treatment equipment and chemical and environmental equipment, are divided into three kinds. That is, FIG. 1A illustrates a spherical type mass transfer vessel, which comprises a breadthwise or radial distributor 1 and a filter medium layer 2, and is mainly applied as an ion exchange resin vessel, FIG. 1B illustrates a vertical type mass transfer vessel, which comprises one distributor 1, selected from various kinds of distributor, and the filter medium layer 2, and is mainly applied as an ion exchange resin vessel, a regeneration vessel, or an activated carbon vessel, and FIG. 1C illustrates a horizontal type mass transfer vessel, which comprises a breadthwise or lattice distributor 1 and the filter medium layer 2, and is applied as a molecular sieve.

As shown in FIGS. 1A to 1C, the distributors 1 for uniformly distributing the flow quantity onto the filter medium layer 2 are respectively installed in the mass transfer vessels. Further, as shown in FIGS. 2A to 2C, the distributors 1 are divided into a radial distributor (with reference to FIG. 2A), a breadthwise (or lengthwise) distributor (with reference to FIG. 2B), and a lattice distributor (with reference to FIG. 2C), and a plurality of spray holes 3 are formed through each of divided spray planes 1a of the distributors such that the spray holes 3 are separated from each other by the uniform interval (with reference to FIG. 5A).

Here, the present invention provides a method for designing spray holes formed through a radial distributor.

As shown in FIG. 5A, in the radial distributor 1, among the conventional distributors installed in a spherical mass transfer vessel for uniformly distributing the flow quantity onto the filter medium layer, the spray holes 3 having the same size, which are separated from each other by the uniform interval, are repeatedly formed through each of the radial distributor 1 from a hub 4 to an edge.

The conventional radial distributor 1 having the spray holes 3 separated from each other by the uniform interval, as shown in FIG. 6A, cannot uniformly distribute the flow quantity 5 onto the upper surface of the filter medium layer 2 in the vessel 10. That is, due to a difference of linear velocities and a difference of space velocities of the flow quantity sprayed by the spray holes 3, the flow quantity 5 sprayed onto the upper surface of the filter medium layer 2 is fluctuated, the flow velocity is high, and a region of the filter medium layer 2, on which the flow quantity is concentrated, is over-saturated to rapidly reach the break point of operation, thereby deteriorating the utility factor of the filter medium layer 2.

SUMMARY OF THE INVENTION

Therefore, the present invention has been made in view of the above problems, and it is an object of the present invention to provide a method for designing a radial distributor installed in a mass transfer vessel filled with a filter medium layer used in water treatment equipment and various chemical and environmental equipment, which uniformly distributes the flow quantity of a fluid to provide a uniform linear velocity of the fluid, thereby improving the utility factor of the filter medium layer.

In accordance with the present invention, the above and other objects can be accomplished by the provision of a method for designing spray holes formed through a distributor positioned in a mass transfer vessel filled with a filter medium layer to distribute the flow quantity of a fluid onto the filter medium layer, in which the spray holes are divisionally formed through the distributor so that the spray flow quantity is uniformly distributed to uniformly maintain the linear velocity of the fluid passing through the vessel.

BRIEF DESCRIPTION OF THE DRAWINGS

The above and other objects, features and other advantages of the present invention will be more clearly understood from the following detailed description taken in conjunction with the accompanying drawings, in which:

FIG. 4C is an enlarged sectional view of the vertical type mass transfer vessel;

DESCRIPTION OF THE PREFERRED EMBODIMENTS

Now, a preferred embodiment of the present invention will be described in detail with reference to the annexed drawings.

Figure 1A:
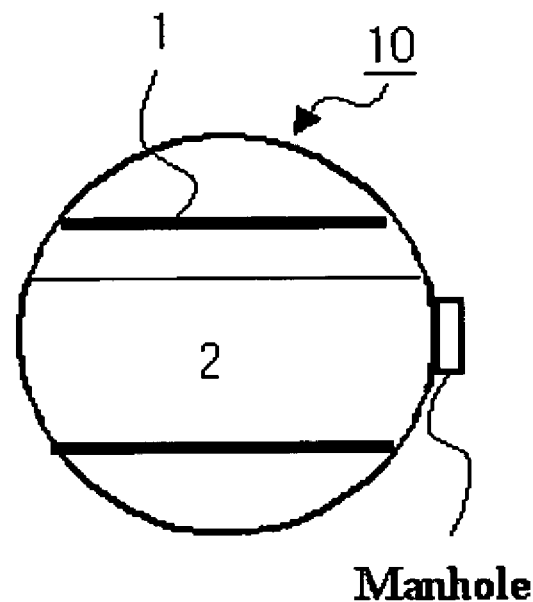
FIGS. 1A, 1B, and 1C are schematic longitudinal sectional view of various mass transfer vessels, to which a radial distributor in accordance with the present invention is applied.
Figure 1B:
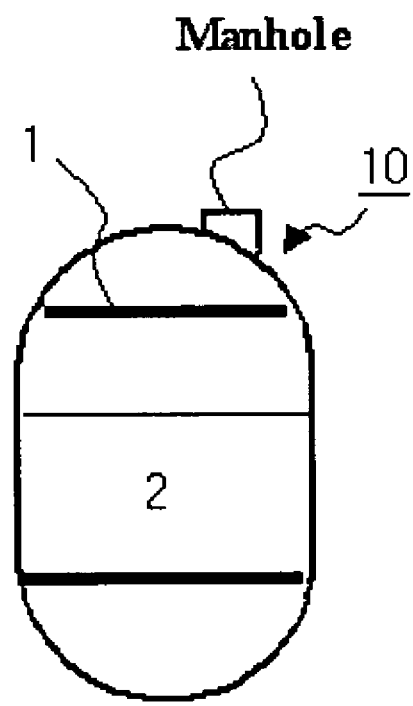
Figure 1C:
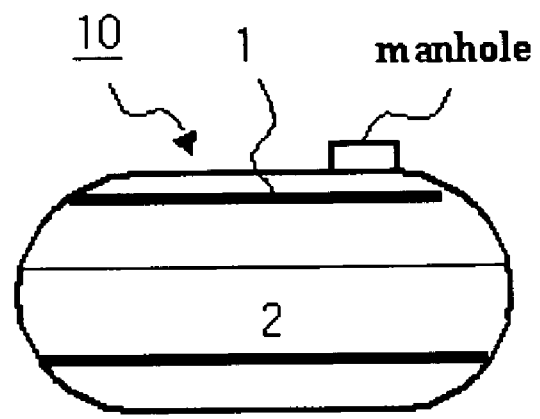
Figure 3:
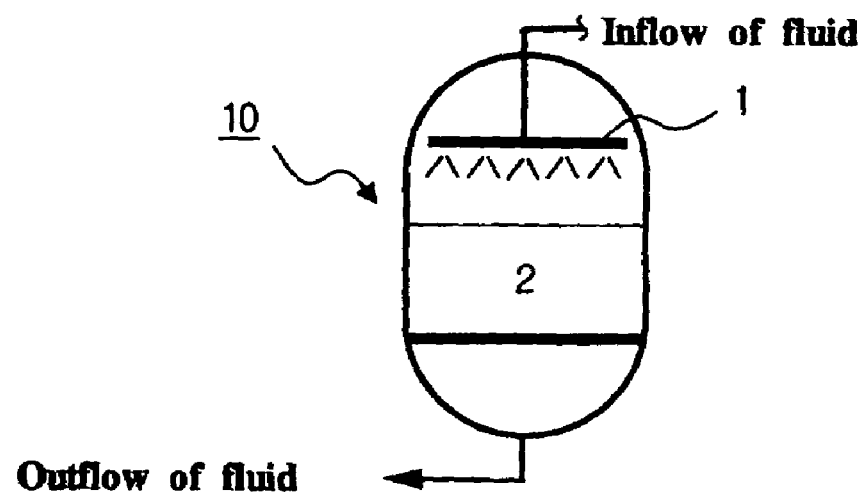
FIG. 3 is a longitudinal sectional view of a vertical type mass transfer vessel in accordance with an embodiment of the present invention.

FIGS. 1A, 1B, and 1C illustrate various mass transfer vessels, and FIG. 3 illustrates a vertical type mass transfer vessel provided with the radial distributor 1, which is most frequently used.

The present invention relates to a method for designing spray holes formed through the radial distributor installed in a vertical type or spherical type mass transfer vessel, and, in the following description of the present invention, elements of the present invention, which are the same as or similar to those of the prior art, are denoted by the same reference numerals even through they are depicted in different drawings.

Figure 4A:
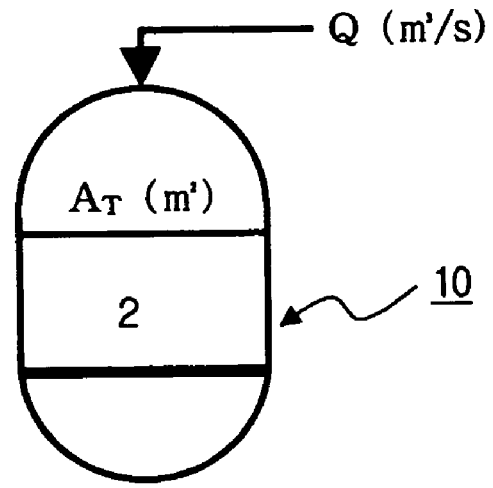
FIGS. 4A, 4B, and 4C are views showing sections of the vertical type mass transfer vessel for illustrating the design of a radial distributor in accordance with the present invention, and particularly.
Figure 4B:
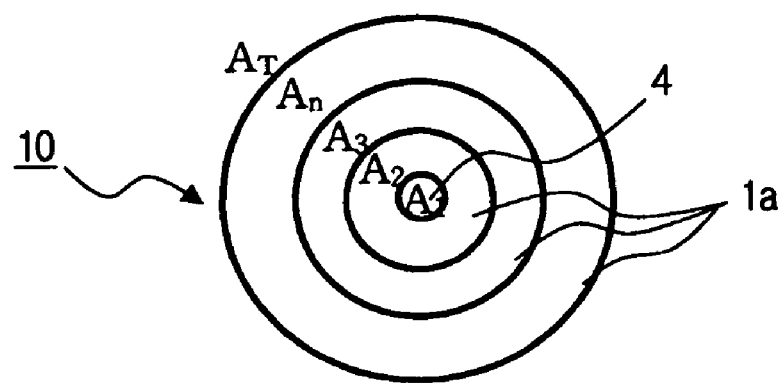
Figure 4C:
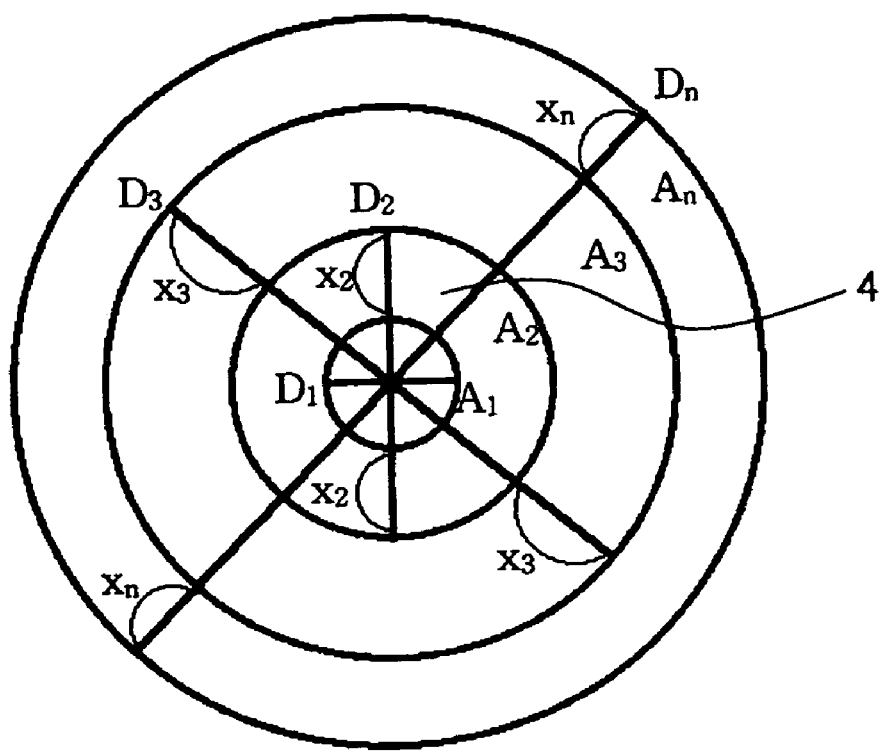

FIG. 4A is a longitudinal sectional view of the vertical type mass transfer vessel 10 according to the present invention, FIGS. 4B and 4C are views showing sections of the vertical type mass transfer vessel for illustrating the design of the spray holes 3 formed through the divided spray planes 1a of the radial distributor 1 in accordance with the present invention.

First, the linear velocity U of the flow quantity Q of a fluid supplied to the above mass transfer vessel 10 is obtained by below Equation [1].

$$U = \frac{Q(m^3/s)}{A_T(m^2)} \quad [1]$$

In above Equation [1], $A_T$ represents the total cross sectional area of the mass transfer vessel 10.

Figure 2A:
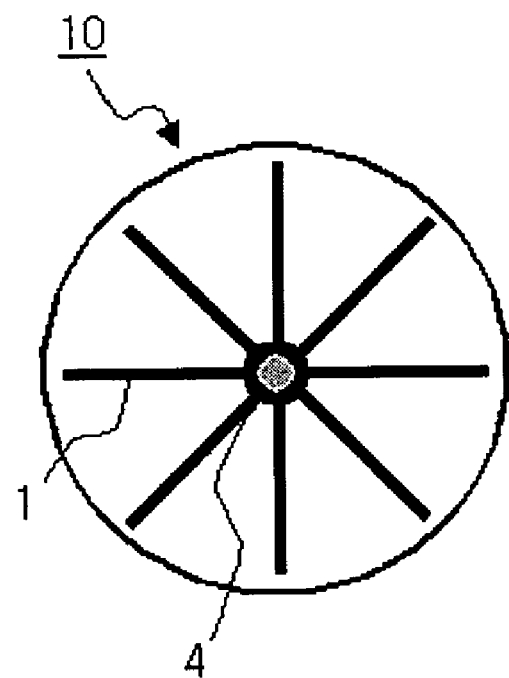
FIGS. 2A, 2B, and 2C are plan views of various kinds of distributor installed in a general mass transfer vessel.
Figure 2B:
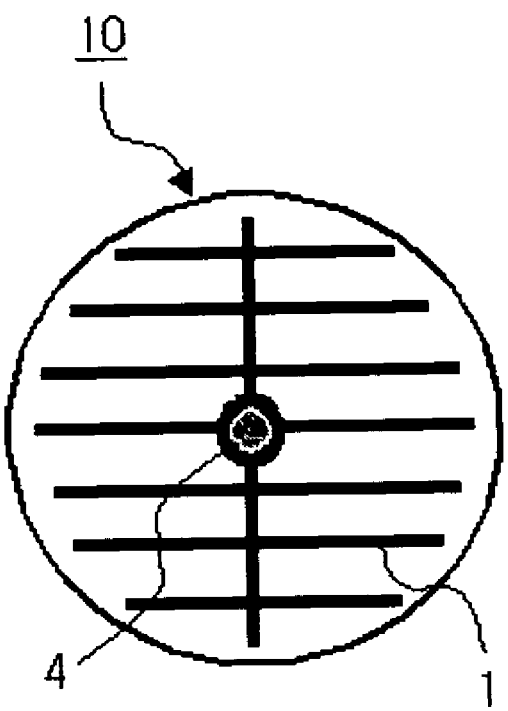
Figure 2C:
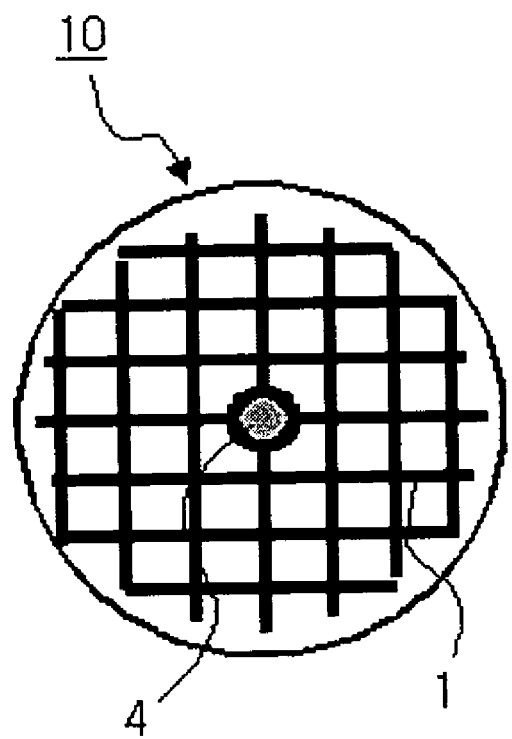

Generally, six or eight radial distributors 1 of FIG. 2A are installed in the mass transfer vessel 10 as shown in FIG. 3. In the present invention, for convenience to induce Equations, it is assumed that only one radial distributor 1 is installed at the diameter of the mass transfer vessel 10.

A. Division of distributor and calculation of positions of spray holes for uniformly distributing flow quantity 1) Division of Distributor The flow quantity at a portion of the divided spray planes 1a close to the hub 4 and the flow quantity at the first spray hole 3 of the radial distributor 1 must be the same. That is, since the linear velocity U of the flow quantity Q must be uniform, with reference to FIGS. 4B and 4C, the cross sectional area $A_1$ of the diameter $D_1$ and the cross sectional area $A_2$ of the diameter $D_2$ must be the same $A_1 = A_2$.

Accordingly, $$A_1 = \frac{\pi D_1^2}{4} \quad [2]$$

In above Equation [2], $A_1$ represents the cross sectional area of the hub 4 and $D_1$ represents the diameter of the hub 4.

$$A_2 = \frac{\pi D_2^2}{4} - A_1 \quad [3]$$

Since $A_1 = A_2$, [4]

$$A_1 = \frac{\pi D_2^2}{4} - A_1,$$

$$2A_1 = \frac{\pi D_2^2}{4}$$

When Equation [2] is applied thereto, $$2 \cdot \frac{\pi D_1^2}{4} = \frac{\pi D_2^2}{4}, \quad 2D_1^2 = D_2^2 \quad [5]$$

$$\therefore D_2 = \sqrt{2} D_1 \quad [6]$$

Above Equation [6] is demonstrated with reference to FIG. 4C, as follows.

$$D_2 = D_1 + 2x_2 \quad [7]$$

When Equation [7] is applied to Equation [5], $$2D_1^2 = (D_1 + 2x_2)^2, \quad [8]$$

$$D_1 + 2x_2 = \sqrt{2} D_1,$$

$$2x_2 = (\sqrt{2} - 1)D_1,$$

$$x_2 = \frac{(\sqrt{2} - 1)}{2} D_1$$

When Equation [8] is applied to Equation [7], $$D_2 = D_1 + (\sqrt{2} - 1)D_1,$$

$$\therefore D_2 = \sqrt{2} D_1 \quad [6]$$

Further, since $A_1 = A_2 = A_3$, $$A_3 = \frac{\pi D_3^2}{4} - A_2 - A_1 \quad [9]$$

$$\frac{\pi D_3^2}{4} = 3 \frac{\pi D_1^2}{4} \quad [10]$$

$$\therefore D_3 = \sqrt{3} D_1$$

Further, in order to demonstrate above Equation [10] with reference to FIG. 4C, Equation [9] is described again, as follows.

Since $A_1=A_2=A_3$, $A_2$ is applied to $A_3$.

$$\frac{\pi D_3^2}{4} = 2A_2 + A_1, \quad [11]$$

That is, $$D_3^2 = 2(D_2^2 - D_1^2) + D_1^2$$

$$D_3^2 = 2D_2^2 - D_1^2$$

With reference to the drawings, since $$D_3 = D_2 + 2x_3 \quad [12],$$

when Equation [12] is applied to Equation [11], $$(D_2 + 2x_3)^2 = 2D_2^2 - D_1^2 \quad [13]$$

$$D_2 + 2x_3 = \sqrt{2D_2^2 - D_1^2}$$

$$x_3 = \frac{\sqrt{2D_2^2 - D_1^2} - D_2}{2}$$

$$= \frac{\sqrt{2(\sqrt{2}D_1)^2 - D_1^2} - \sqrt{2}D_1}{2}$$

$$= \frac{\sqrt{2(2D_1^2) - D_1^2} - \sqrt{2}D_1}{2}$$

$$= \frac{\sqrt{3D_1^2} - \sqrt{2}D_1}{2}$$

$$= \frac{\sqrt{3}D_1 - \sqrt{2}D_1}{2}$$

$$= \frac{(\sqrt{3} - \sqrt{2})D_1}{2}$$

When, Equation [13] and Equation [6] are applied to Equation [12], $$D_3 = D_2 + 2x_3$$

$$D_3 = \sqrt{2}D_1 + (\sqrt{3} - \sqrt{2})D_1$$

$$\therefore D_3 = \sqrt{3}D_1 \quad [10]$$

Below Equations are obtained by synthesizing $D_1$, $D_2$, and $D_3$.

$$\therefore D_n = \sqrt{n}\, D_1 \quad [14]$$

$$\therefore n = \left(\frac{D_n}{D_1}\right)^2 \quad [15]$$

In above Equation, n represents the number of the divided spray planes according to the diameter of the vessel, i.e., the number of the lines of the spray holes 3 of the distributor 1 including the hub, $D_1$ represents the diameter of the hub, and $D_n$ represents the diameter of the mass transfer vessel.

Accordingly, when the diameter $D_1$ of the hub 4 and the diameter $D_n$ of the mass transfer vessel 10 are given, the number n of the divided spray planes is obtained using Equation [15], and the diameters of the respective divided spray planes are obtained by applying the number n of the divided spray planes to Equation [14].

Since the distributor 1 is substantially installed in the radial shape centering on the hub 4, Equation [15], which is calculated assuming that one distributor 1 is positioned at the diameter $D_n$ of the mass transfer vessel 10, is adjusted as below Equation [16].

The number $L_n$ of the divided spray planes 1a of the one radial distributor 1 positioned at the radius of the mass transfer vessel 10 is as follows.

$$\therefore L_n = \frac{n}{2} = \frac{1}{2}\left(\frac{D_n}{D_1}\right)^2 \quad [16]$$

When the diameter $D_1$ of the hub 4 is excessively small, the number $L_n$ of the divided spray planes 1a becomes excessively large, thereby causing a difficulty in manufacturing the distributor 1. In this case, a virtual diameter $D_1$, which is slightly larger than the diameter of the hub 4, is set.

2) Calculation of Positions of Spray Holes

From Equation [8] and Equation [13], the width $X_n$ of a divided spray plane positioned between the diameters $D_n-1$ and $D_n$ of circles at an interface between spray planes is obtained as follows.

$$x_n = \frac{(\sqrt{n} - \sqrt{n-1})}{2}D_1 \quad [17]$$

Further, the positions of the spray holes 3 of the divided spray planes of each of the distributors 1 centering on the hub 4 must be central areas of respective points, and the substantial distributors 1, which are radially distributed, are positioned at the radius of the mass transfer vessel 10. Accordingly, Equations for calculating the positions of the spray holes 3 of the respectively distributors 1 are as follows.

$$H_1 = \frac{x_1}{2} = \frac{(\sqrt{1} - 0)}{4}D_1 = \frac{D_1}{4} = \frac{r_1}{2}, \quad [18]$$

$$H_2 = \frac{x_2}{2} = \frac{(\sqrt{2} - 1)}{4}D_1 = \frac{(\sqrt{2} - 1)r_1}{2},$$

$$\ldots,$$

$$\therefore H_n = \frac{x_n}{2} = \frac{(\sqrt{n} - \sqrt{n-1})}{4}D_1 = \frac{(\sqrt{n} - \sqrt{n-1})r_1}{2}$$

In above Equation, $H_n$ represents the position of the spray holes on the divided spray plane n, $D_1$ is $2 \cdot r_1$ ($D_1 = 2 \cdot r_1$), and $r_1$ represents the radius of the hub.

The position of the spray hole from the starting point is as follows.

$$LH_1 = \frac{D_0}{2} + \frac{x_1}{2} = \frac{2r_0}{2} + \frac{(\sqrt{1} - 0)}{4}D_1 \quad [18\text{-}1]$$

$$= r_0 + \frac{D_1}{4} = r_0 + \frac{r_1}{2},$$

$$LH_2 = \frac{D_1}{2} + \frac{x_2}{2} = \frac{2r_1}{2} + \frac{(\sqrt{2} - 1)}{4}D_1$$

$$= r_1 + \frac{(\sqrt{2} - 1)r_1}{2},$$

$$LH_3 = \frac{D_2}{2} + \frac{x_3}{2} = \frac{2r_2}{2} + \frac{(\sqrt{3}-\sqrt{2})}{4}D_1$$

$$= r_2 + \frac{(\sqrt{2}-\sqrt{2})r_1}{2},$$

..., $$\therefore LH_n = \frac{D_{n-1}}{2} + \frac{x_n}{2} = \frac{2r_{n-1}}{2} + \frac{(\sqrt{n}-\sqrt{n-1})}{4}D_1$$

$$= r_{n-1} + \frac{(\sqrt{n}-\sqrt{n-1})r_1}{2}$$

In above Equation, $LH_n$ represents the distance of the spray hole of the divided spray plane n from the starting point, and the starting point $D_0$ is $r_0$, i.e., ($D_0=r_0=0$), $D_1$ is $2 \cdot r_1$ ($D_1=2 \cdot r_1$), and $r_1$ represents the radius of the hub.

B. Calculation of Number and Diameters of Spray Holes

1) Calculation of Total Number of Spray Holes

When the number of distributors to be installed and the number of spray holes respectively formed through the divided spray planes of each of the distributors are calculated, the total number of the spray holes formed through all the distributors including the hub is calculated.

$$\therefore N_{TH} = N_H \times N_L \quad [19]$$

In above Equation, $N_{TH}$ represents the total number of the spray holes, $N_H$ represents the number of the spray holes formed through each of the distributors (=n), and $N_L$ represents the number of the distributors.

2) Calculation of Diameters of Spray Holes

When the total number $N_{TH}$ of the spray holes is calculated, the spray flow quantity $q_H$ of each of the spray holes is obtained from the influent flow quantity Q.

$$Q = N_{TH} \times q_H \quad [20]$$

In above Equation, $q_H$ represents the spray flow quantity of the spray hole.

$$\therefore q_H = \frac{Q}{N_{TH}} \quad [21]$$

Here, since $q_H = A_H \times u$, in above Equation, $A_H$ represents the cross sectional area of the spray hole, and u represents the linear velocity.

$$A_H = \frac{q_H}{u} \quad [22]$$

Further, since $$A_H = \frac{\pi \times D_H^2}{4},$$

the diameter $D_H$ of the spray hole is calculated as follows.

$$D_H = \sqrt{\frac{q_H}{u} \times \frac{4}{\pi}} \quad [23]$$

C. Comparison of Cross Sectional Areas of Divided Spray Planes Before and After Design Equations of the Present Invention is Applied Below Table 1 comparatively illustrates cross sectional areas of divided spray planes of spray holes before and after the design equations of the present invention is applied.

TABLE 1

| Before application (when intervals between holes are uniform) | After application (when intervals between holes are adjusted) |
|---|---|
| $D_1$, $A_1 = \frac{\pi D_1^2}{4}$ | $D_1$ $A_1 = \frac{\pi D_1^2}{4}$ |
| $D_2 = 2D_1$ $A_2 = \frac{\pi(2D_1)^2}{4} - A_1$ $= \frac{\pi(2D_1)^2}{4} - \frac{\pi D_1^2}{4}$ $= \frac{4\pi D_1^2 - \pi D_1^2}{4}$ $= \frac{3\pi D_1^2}{4}$ | $D_2 = \sqrt{2}\,D_1$ $A_2 = \frac{\pi(\sqrt{2}\,D_1)^2}{4} - A_1$ $= \frac{2\pi D_1^2}{4} - \frac{\pi D_1^2}{4}$ $= \frac{2\pi D_1^2 - \pi D_1^2}{4}$ $= \frac{\pi D_1^2}{4}$ |
| $D_3 = 3D_1$ $A_3 = \frac{\pi(3D_1)^2}{4} - A_2 - A_1$ $= \frac{9\pi D_1^2 - 3\pi D_1^2 - \pi D_1^2}{4}$ $= \frac{5\pi D_1^2}{4}$ | $D_3 = \sqrt{3}\,D_1$ $A_3 = \frac{\pi(\sqrt{3}\,D_1)^2}{4} - A_2 - A_1$ $= \frac{3\pi D_1^2 - \pi D_1^2 - \pi D_1^2}{4}$ $= \frac{\pi D_1^2}{4}$ |
| $D_4 = 4D_1$ $A_4 = \frac{\pi(4D_1)^2}{4} - A_3 - A_2 - A_1$ $= \frac{16\pi D_1^2 - 5\pi D_1^2 - 3\pi D_1^2 - \pi D_1^2}{4}$ $= \frac{7\pi D_1^2}{4}$ | $D_4 = \sqrt{4}\,D_1$ $A_4 = \frac{\pi(\sqrt{4}\,D_1)^2}{4} - A_3 - A_2 - A_1$ $= \frac{4\pi D_1^2 - \pi D_1^2 - \pi D_1^2 - \pi D_1^2}{4}$ $= \frac{\pi D_1^2}{4}$ |
| $D_n = nD_1$ $A_n = \frac{(2n-1)\pi D_1^2}{4}$ | $D_n = \sqrt{n}\,D_1$ $A_n = \frac{\pi D_1^2}{4}$ |

With reference to Table 1, a difference of the cross sectional areas of divided spray planes of spray holes, before and after the design equations of the present invention are applied is as follows.

A difference of cross sectional areas of divided spray planes=cross sectional area of the divided spray plane of conventional spray hole−cross sectional area of the divided spray plane of spray hole of the present invention $$\Delta A_n = \frac{(2n-1)\pi D_1^2}{4} - \frac{\pi D_1^2}{4}$$

$$\Delta A_n = \frac{(2n-2)\pi D_1^2}{4}$$

That is, the spray area of the $n^{th}$ spray hole of the conventional structure is 2n−2 times the spray area of the $n^{th}$ spray hole of the structure of the present invention.

Thereby, since the spray flow quantity of the conventional structure is $$\frac{1}{2n-2}$$

times the spray flow quantity of the structure of the present invention, the amount of the filter medium of approximately $$\frac{2n-1}{2n-2}$$

is not used.

Figure 5A:
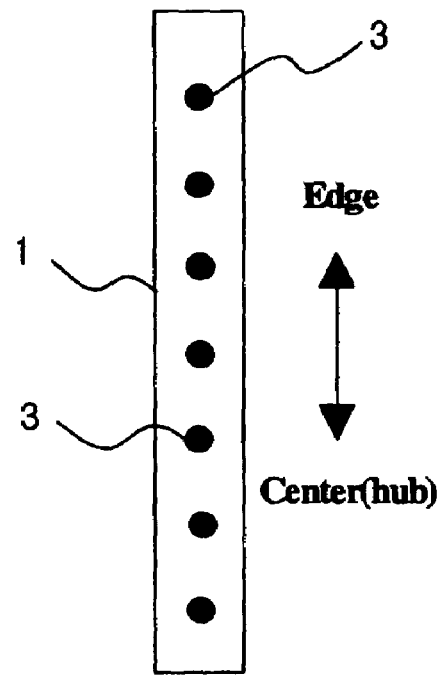
FIGS. 5A and 5B are schematic views illustrating the arrangements of spray holes formed through the conventional radial distributor and the radial distributor of the present invention.
Figure 5B:
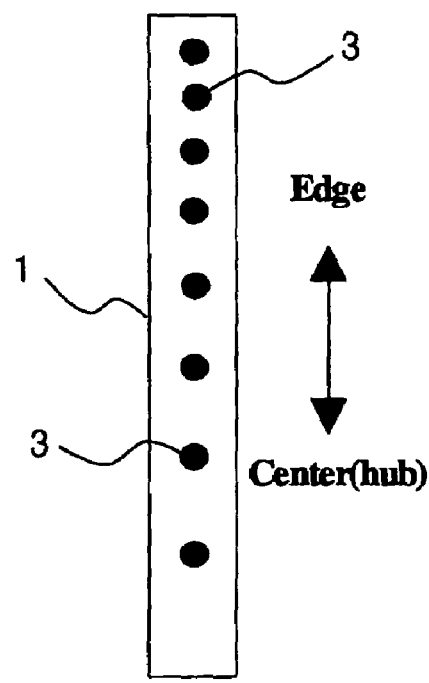
Figure 6A:
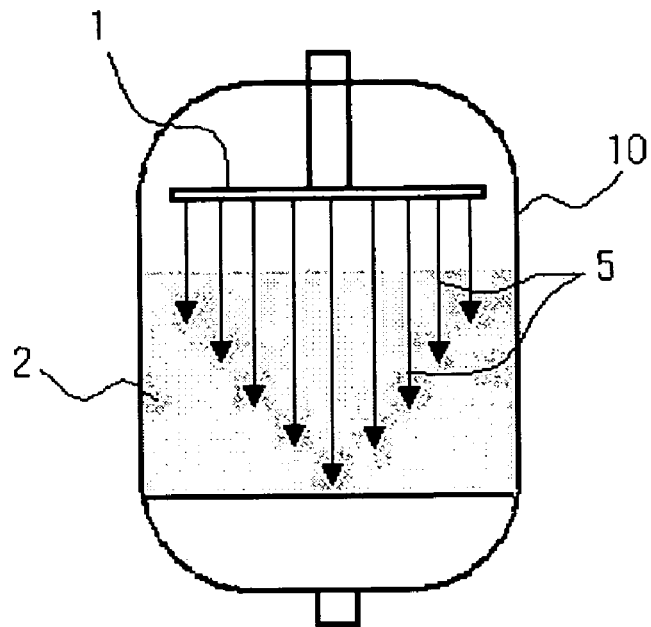
FIGS. 6A and 6B are longitudinal sectional views of mass transfer vessels illustrating differences of linear (or space) velocities of spray flow quantities of the conventional radial distributor and the radial distributor of the present invention.
Figure 6B:
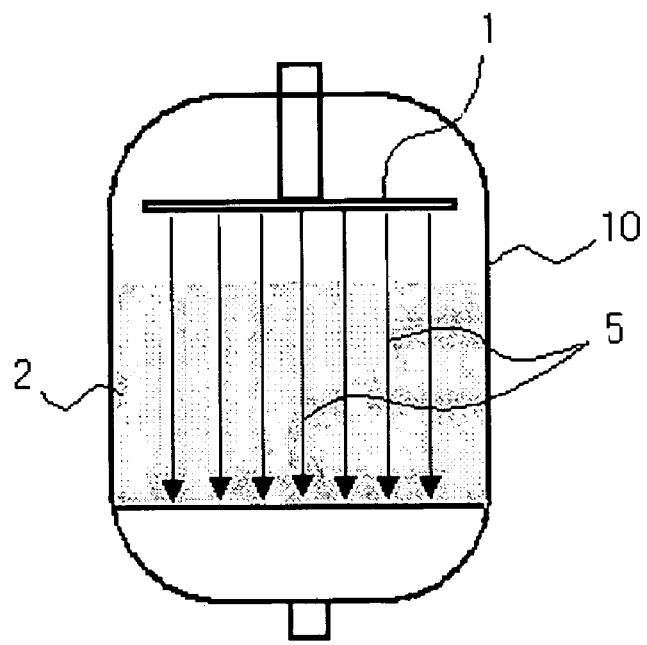
Figure 7A:
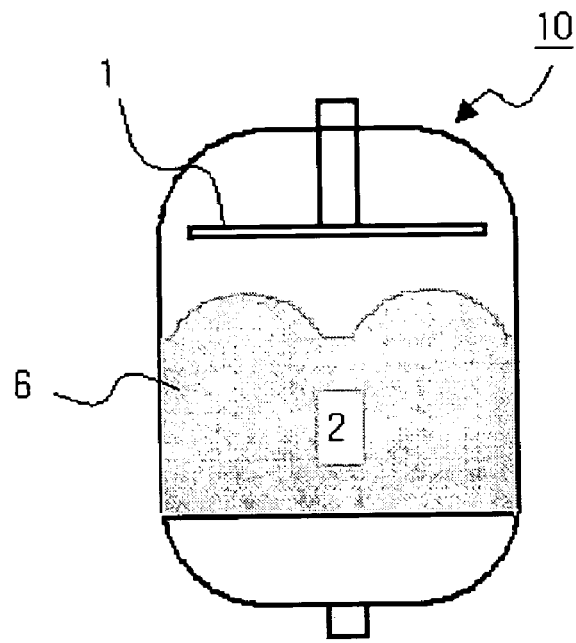
FIGS. 7A and 7B are longitudinal sectional views of mass transfer vessels illustrating the fluctuation of filter medium layers of the conventional radial distributor and the radial distributor of the present invention.
Figure 7B:
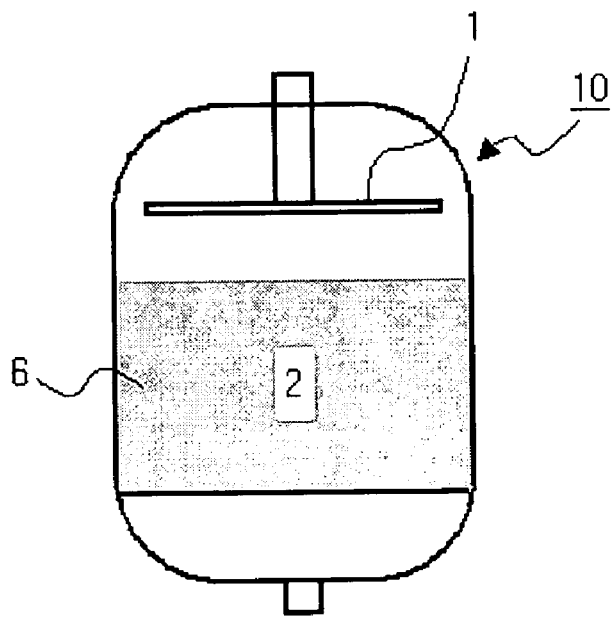

As shown in FIGS. 5A and 5B, the intervals between the neighboring spray holes 3 formed through the distributor 1 of the present invention are gradually decreased from the hub 4 (center) of the distributor 1 to the edge of the distributor 1, but the intervals between the neighboring spray holes 3 formed through the conventional distributor 1 are uniform.

As shown in FIGS. 6A and 6B and FIGS. 7A and 7B illustrating mass transfer vessels provided with the conventional radial distributor and the radial distributor of the present invention, the filter medium layer 2 of the mass transfer vessel 10 provided with the radial distributor 1 of the present invention is stabilized by the flow quantities sprayed from the spray holes 3 at the uniform linear velocity, but the upper part of the filter medium layer 2 of the mass transfer vessel 10 provided with the conventional radial distributor 1 is fluctuated by a difference of linear velocities of the flow quantities sprayed from the spray holes 3.

As apparent from the above description, the present invention provides a method for designing a radial distributor positioned in a mass transfer vessel installed in water purification equipment, condensate water demineralization equipment, sewage treatment equipment, or chemical reactors to perform filtration, adsorption, ion exchange, regeneration of an ion exchange resin, and chemical reaction. The method of the present invention has tangible and intangible effects as follows.

A. Tangible Effects

1) Increase in Mass Transfer Efficiency

The increase in efficiency of 10~30% in a mass transfer process, such as filtration, adsorption, and ion exchange, and in yield due to the uniform distribution of a chemical reacting solution and a chemical cleaning solution will be expected.

2) Increase in Regenerating Efficiency

The increase in regenerating rate due to the uniform spray by the improvement of spray planes of the distributor for injecting regenerating chemicals, i.e., the increase in the regenerating efficiency, will be expected.

3) Reduction of Energy Consumption Due to Increase in Mass Transfer Efficiency

The increase in the utility factor of a filter medium due to the increase in the mass transfer efficiency when a fluid passes through the filter medium and regeneration is performed elongates the regeneration cycle, i.e., reduces the number of regeneration, thereby reducing the regeneration costs.

B. Intangible Effects

1) Improvement of Operating Quality

The uniform distribution of the flow quantity in the mass transfer vessel facilitates the optimum mass transfer, thereby improving the operating quality, such as the improvement of impurity of the discharged fluid.

2) Extension of Life Span of Equipment

The extension of operating time of each of unit devices, i.e., the extension of regeneration cycle of the unit devices, reduces mechanical and chemical stresses applied to equipment, thereby lengthening the life span of the equipment.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for designing spray holes formed through spray planes of radial distributors, connected with a hub, positioned in a mass transfer vessel filled with various filter medium layers installed in water treatment equipment, chemical equipment, or environmental equipment, to uniformly distribute the flow quantity of a fluid, wherein:

the number $L_n$ of divided spray planes of one radial distributor positioned at the radius of the vessel satisfies below Equation [16];

positions $H_n$ of the spray holes arranged in a line or plural lines on the divided spray planes and separated from each other by intervals, which are gradually decreased from the hub to the edge, are determined by below Equation [18]; and the total number $N_{TH}$ of the spray holes and the diameters $D_H$ of the spray holes are respectively determined by below Equations [19] and [23], $$L_n = \frac{n}{2} = \frac{1}{2}\left(\frac{D_n}{D_1}\right)^2 \qquad [16]$$

(Here, n is the number of the divided spray planes on the basis of the diameter of the vessel, i.e., the number of the lines of the spray holes of the distributor including the hub, $D_1$ is the diameter of the hub, and $D_n$ is the diameter of the mass transfer vessel.), $$H_n = \frac{x_n}{2} = \frac{(\sqrt{n} - \sqrt{n-1})}{4} \qquad [18]$$

$$D_1 = \frac{(\sqrt{n} - \sqrt{n-1})r_1}{2}$$

(Here, $X_n$ is the width of the divided spray plane positioned between the diameters $D_{n-1}$ and $D_n$ of circles at an interface between spray planes, n is the number of the divided spray planes on the basis of the diameter of the vessel, and $D_1$ is the diameter of the hub, and $r_1$ is the radius of the hub.), $$N_{TH} = N_H \times N_L \qquad [19]$$

(Here, $N_H$ is the number of the spray holes formed through each of the distributors, and $N_L$ is the number of the distributors.), and $$D_H = \sqrt{\frac{q_H}{u} \times \frac{4}{\pi}} \qquad [23]$$

(Here, $q_H$ is the spray flow quantity of each of the spray holes, and u is the linear velocity of the spray flow quantity.).

2. The method as set forth in claim 1, wherein positions $LH_n$ of the spray holes, on the divided spray planes, from the starting point are determined by below Equation [18-1].

$$LH_n = \frac{D_{n-1}}{2} + \frac{x_n}{2} = \frac{2r_{n-1}}{2} + \frac{(\sqrt{n} - \sqrt{n-1})}{4} \qquad [18-1]$$

$$D_1 = r_{n-1} \frac{(\sqrt{n} - \sqrt{n-1})r_1}{2}$$

(Here, the starting point $D_0$ is $r_0$ ($D_0=r_0=0$), $D_1$ is $2 \cdot r_1$ ($D_1=2 \cdot r_1$), and $r_1$ is the radius of the hub.).

* * * * *